United States Patent
Peck et al.

(10) Patent No.: US 8,210,723 B2
(45) Date of Patent: Jul. 3, 2012

(54) LED LENS ARRAY OPTIC WITH A HIGHLY UNIFORM ILLUMINATION PATTERN

(75) Inventors: John P. Peck, Manasquan, NJ (US); Chakrakodi V. Shastry, Princeton, NJ (US)

(73) Assignee: Dialight Corporation, Farmingdale, NJ (US)

( * ) Notice: Subject to any disclaimer, the term of this patent is extended or adjusted under 35 U.S.C. 154(b) by 858 days.

(21) Appl. No.: 11/771,094

(22) Filed: Jun. 29, 2007

(65) Prior Publication Data

US 2009/0002985 A1    Jan. 1, 2009

(51) Int. Cl.
*F21V 1/00* (2006.01)
*F21V 5/00* (2006.01)

(52) U.S. Cl. ........ 362/330; 362/326; 362/235; 362/236; 362/237; 362/311.02

(58) Field of Classification Search .................. 362/326, 362/330, 235–237, 311.02
See application file for complete search history.

(56) References Cited

U.S. PATENT DOCUMENTS

| | | | | |
|---|---|---|---|---|
| 7,125,131 B2 * | 10/2006 | Olczak | ............................ | 362/19 |
| 2006/0012993 A1 * | 1/2006 | Ohkawa | ........................ | 362/240 |
| 2006/0203494 A1 * | 9/2006 | Ohkawa | ........................ | 362/339 |

OTHER PUBLICATIONS

U.S. Appl. No. 12/580,840, filed Oct. 16, 2009, Peck.

* cited by examiner

*Primary Examiner* — Diane Lee
*Assistant Examiner* — Sean Gramling
(74) *Attorney, Agent, or Firm* — Oblon, Spivak, McClelland, Maier & Neustadt, L.L.P.

(57) ABSTRACT

An LED (light emitting diode) illumination device that can generate a uniform light output illumination pattern. The illumination source includes an array of LEDs. Forward of the LEDs is an array of negative lens surfaces. At a distance from the LED the width W of the lens and the spacing D between the LEDs enhances creating the uniform light output illumination pattern. The negative lens surface can be non-symmetric and take a conic or conic-like shape.

13 Claims, 9 Drawing Sheets

LED LENS ARRAY OPTIC WITH A HIGHLY UNIFORM ILLUMINATION PATTERN

BACKGROUND OF THE INVENTION

1. Field of the Invention

The present invention is directed to an LED (light emitting diode) array and lens array optic that creates a highly uniform illumination pattern.

2. Discussion of the Background

Due to mediocre light output, LED use in the past was primarily limited to applications where only small surface areas were illuminated. In these applications the light was concentrated into a narrow beam using an optic designed to take the wide angle light output of an LED and collimate it using a lens, discussed below with respect to FIG. 3. For high-power LEDs the collimation was accomplished using a secondary optic. Due to cost reductions and performance improvements LEDs can now be used in general illumination where large surface areas are illuminated. Examples of these applications include parking garages, parking lots, and roadways. These new applications require different optical designs. In particular these applications require high spreading of the light compared to the high collimation required for previous applications.

As per IESNA specification RP-20-98, and with reference to FIG. 4, the "basic" recommended maintained illuminance values for parking garage lighting fixtures 40 are spaced such that throughout the garage there is uniform illuminance with a maximum to minimum illuminance ratio not greater than 10 to 1, with a minimum requirement of 1 footcandle (fc) everywhere on a target area 42. In addition, a minimum vertical illuminance of 0.5 fc is required 5 feet above ground on a vertical detector 45 oriented in the vertical direction. Thus, each light fixture 40 has to illuminate an area within which the above photometric requirements are met.

SUMMARY OF THE INVENTION

To meet these illumination requirements with the least number of LEDs, a new optical system must be designed. The invention herein creates an optical system that redistributes the LED light to satisfy the needs of general illumination applications. This minimizes the number of LEDs and results in a cost effective light fixture.

The present inventors recognized that certain applications require uniform illumination of large target areas. In some cases the illumination must not exceed a ratio of 10 to 1 between the highest and lowest illuminance values within the lighted target area.

Accordingly, one object of the present invention is to provide a novel LED illumination device that can generate a highly uniform illumination pattern appropriate for general illumination applications.

The present invention achieves the above-noted results by incorporating an array of negative lenses into a light cover. Normally light losses result due to the optic and the light cover. In the present invention there are only one set of light losses because the lens optic is integrated into the light cover. An array of LEDs is positioned behind the array of negative lenses. With the arrangement described herein, the higher intensity light emitted mainly forward of the LEDs is diverted away from the central axis by the negative lenses. The lens width is limited and therefore the wide angle light emitted by the LEDs is not diverted by the lenses. The dimensions of the negative lenses as well as the distance between the LEDs and the negative lenses are therefore controlled.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
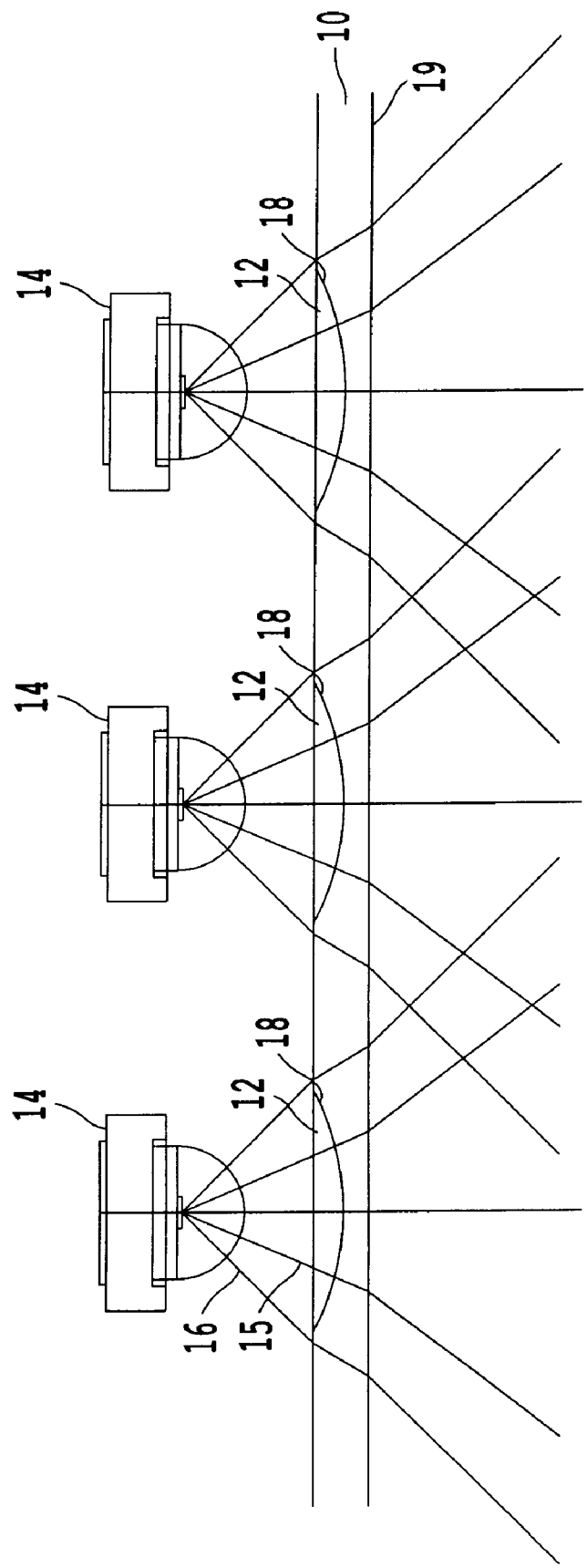
FIG. 1 shows an embodiment of a light device of the present invention.

Referring now to the drawings, wherein like reference numerals designate identical or corresponding parts throughout the several views, and more particularly to FIG. 1, an embodiment of an LED illumination device of the present invention is shown.

As shown in FIG. 1, an LED illumination device of the present invention includes a light cover 10 with an integrated array of negative lenses 12, each with a negatively powered lens surface 18, positioned forward of an LED array formed of a plurality of LEDs 14. The light cover 10 also has a second surface 19. The integrated array of negative lenses 12 are formed by removing material from the light cover 10. That is, each negative lens 12 is a portion of the lens cover 10 where material is absent. This would typically be done by incorporating the lens features of the negative lenses 12 into a mold that is used to make the light cover 10. The light cover 10 could be made of plastic or glass. Examples of moldable plastic materials are polycarbonate, acrylic, or silicone. The width W of the surfaces of negative lenses 12 and the distance D between the negative lens' surface and the LED 14 die preferably fall with certain values, as discussed below.

Figure 2:
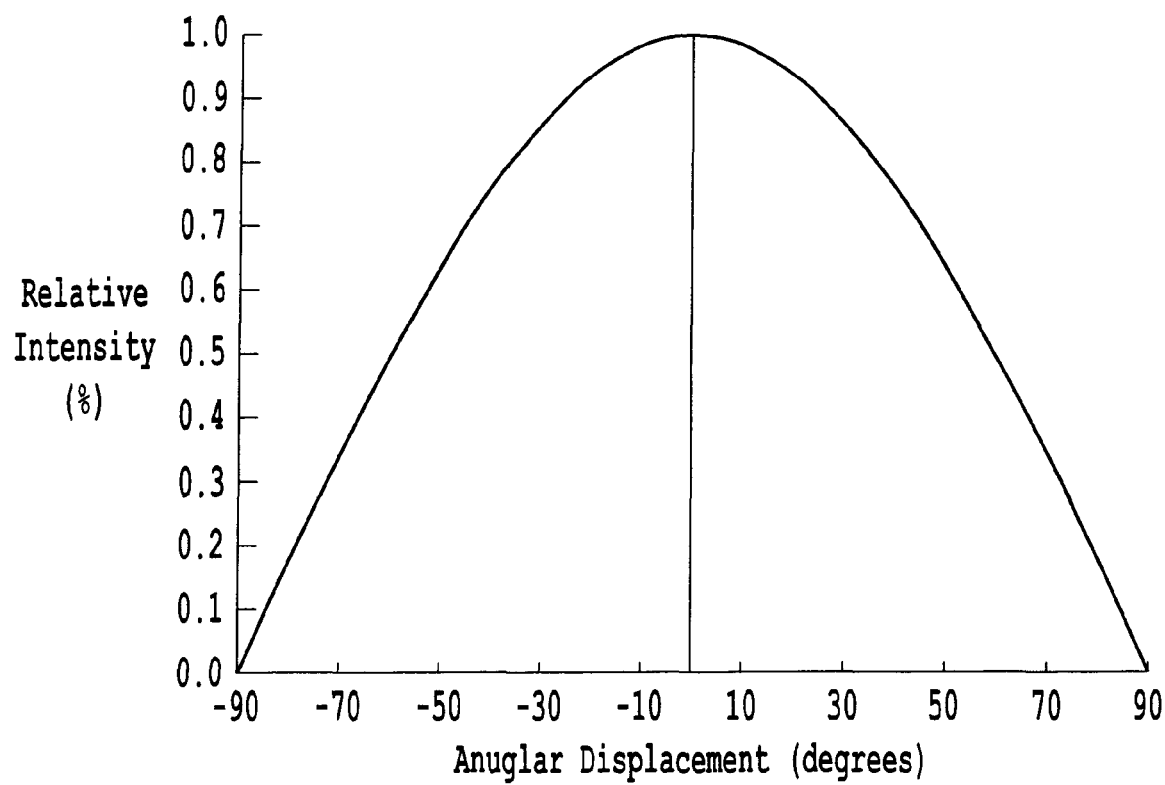
FIG. 2 shows an example intensity pattern output from an LED light source.

LEDs are unique in that they emit light into a hemispherical pattern from about −90° to 90° as shown in FIG. 2. In FIG. 2 the LED has a beam spread of about 120°. That is, the 50% points are at about +/−60°.

Figure 3:
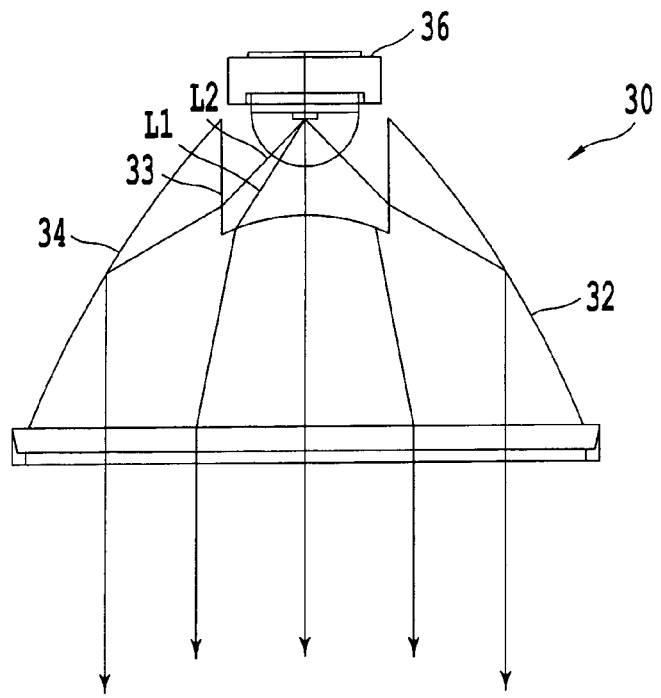
FIG. 3 shows a background LED light.

FIG. 3 shows a background LED light device 30 showing how LEDs are conventionally used in a light device. In the background example device shown in FIG. 3 a secondary lens optic 32 is used to reduce the beam spread of light output from the LED 36 by collimating the light forward. This collimated light can be used to illuminate relatively small target areas. The light L1 forward of the LED 36 is collimated by refraction through a positive lens surface. The light at higher angles L2 refracts into the optic 32 via the inner side wall 33 of the optic 32 and then reflects off the outer side wall 34 of the optic 32 by total internal reflection (TIR). Thereby, the beam spread can be reduced from 120° to just a few degrees.

The present inventors recognized a very different optic is needed to redistribute LED light to uniformly illuminate large target areas. Furthermore, in applications such as parking garages additional light is needed at very high angles to illuminate the vertical target area as described in the IESNA specifications. In contrast to the background structure shown in FIG. 3, in the embodiment of FIG. 1 the optic has a respective negative lens 12 forward of each LED 14. In FIG. 1 the light rays 15 exiting the LED 14 at angles near the center axis (which correspond to light L1 in FIG. 3) are bent away from the center of the target area and are instead directed toward the edges of the target area. Also in contrast to the background structure shown in FIG. 3, in the embodiment of FIG. 1 the high angle light rays 16 (which correspond to light L2 in FIG. 3) are not redirected by the lens 12, but are allowed to continue at high angles.

Figure 4:
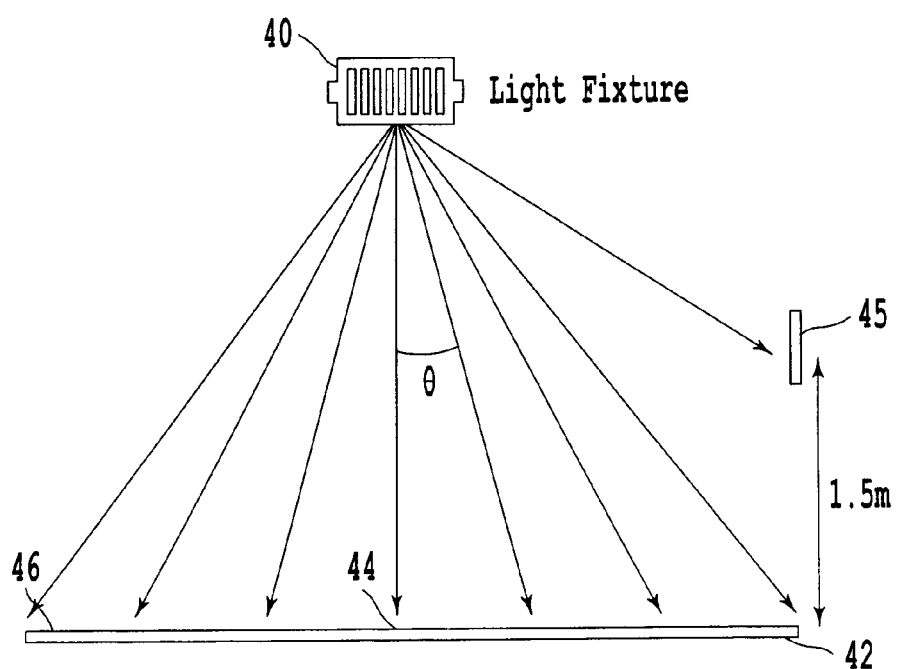
FIG. 4 shows the output from a light source as it illuminates a target surface in front of the light source.
Figure 5:
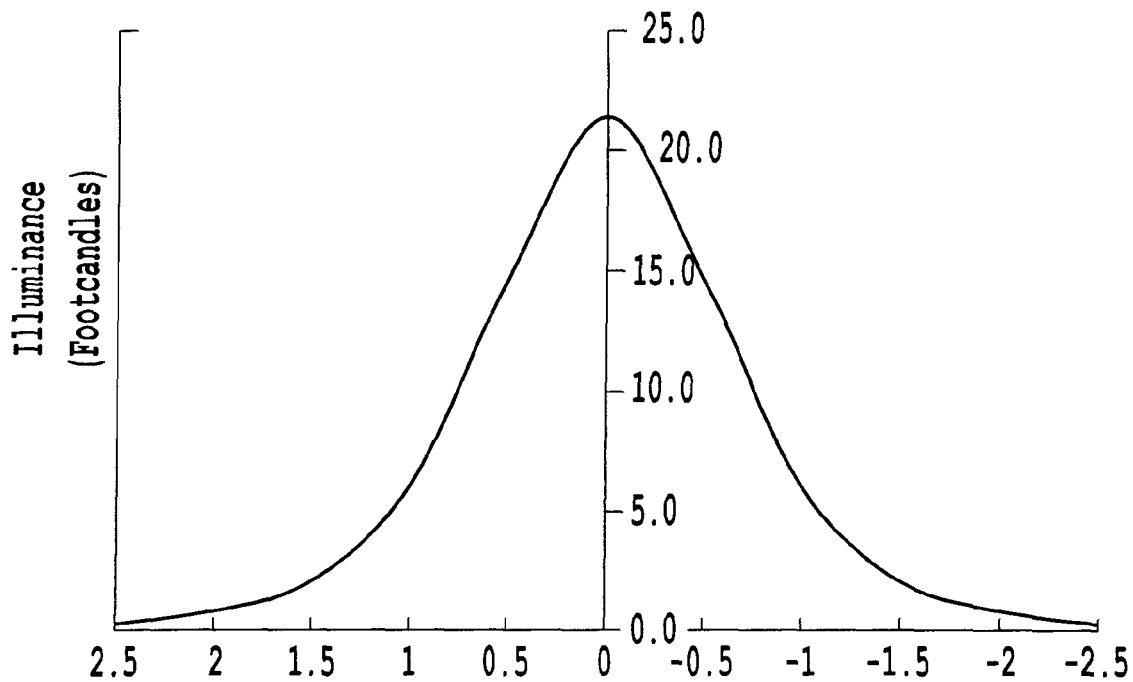
FIG. 5 shows an output and illumination profile from a light source without an optic.

With reference to FIG. 4, when a light source 40 illuminates a planar target surface area 42 directly in front of it, the illuminance in footcandles (fc) decreases as a function of the $\cos^3 \theta$. The angle $\theta$ is shown in FIG. 4. This is known as the $\cos^3 \theta$ effect. The LED distribution shown in FIG. 2 approximately follows a $\cos \theta$ distribution. A $\cos^4 \theta$ illumination profile results when a light source with a $\cos \theta$ intensity distribution illuminates a surface due to the combination of the $\cos \theta$ and the $\cos^3 \theta$ effect. This would be the case if no optic is used with a typical LED source. An example of this illumination profile is shown in FIG. 5. In the example of FIG. 5 a luminaire is mounted at 8 feet and includes 58 LEDs each emitting 83 lumens. The maximum illuminance is about 21 fc and the minimum illuminance is about 0.2 fc. The resulting illuminance ratio is over 100 to 1 and would exceed the requirements of most applications. In this example of FIG. 5 there is also a hotspot in the center and the lack of illuminance uniformity would be objectionable.

In the present invention, utilizing the light device of FIG. 1, the hotspot is reduced or eliminated by redirecting most of the high intensity light away from the center point 44 of a target area 42 as shown in FIG. 4. The higher intensity light is more appropriately directed at higher angles to illuminate the edge 46 of the target area 42. Much higher intensity light is required at angles that correspond to the edge 46 of the target in order to compensate for the $\cos^3 \theta$ effect. This is accomplished with the negatively powered lens surface 18 shown in FIG. 1. In the example here of a luminaire mounted at 8 feet and including 58 LEDs each emitting 83 lumens, the maximum illumination in the target area should be well below 10 fc to stay within a 10 to 1 uniformity ratio. That is to say, that there is not enough light to illuminate a significant portion of the target area above 10 fc and also maintain the rest of the target are above 1 fc.

Figure 6A:
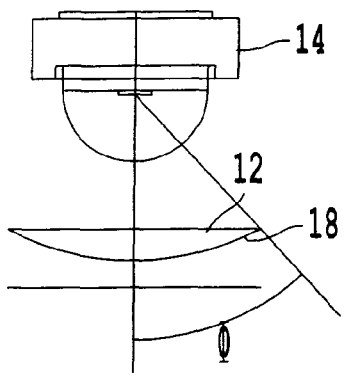
FIGS. 6A and 6B show light output from an LED source impinging on a corresponding negative lens according to the present invention.

To reduce the illuminance to below 10 fc in the present invention the negative lenses 12 redirect the light emitted from the LED that would have illuminated the center of the target area 44. More specifically, between 0 and 0.8 ratio of distance to mounting height (RDMH) as well as 0 and −0.8 RDMH shown in FIG. 5. This corresponds to an angle ($\theta$) between 0° and 39° as well as 0° and −39°. FIG. 6A shows the angle ($\Phi$) of the rays emitted by the LED. The angles ($\Phi$) and ($\theta$) are the same before the rays strike the lens. The angles ($\Phi$) and ($\theta$) are also the same if no lens is used as in the results shown in FIG. 5.

FIG. 6A shows the relationship of one LED light source 14 and one negative lens 12 in the present invention, and specifically the negatively powered lens surface 18.

Figure 6B:
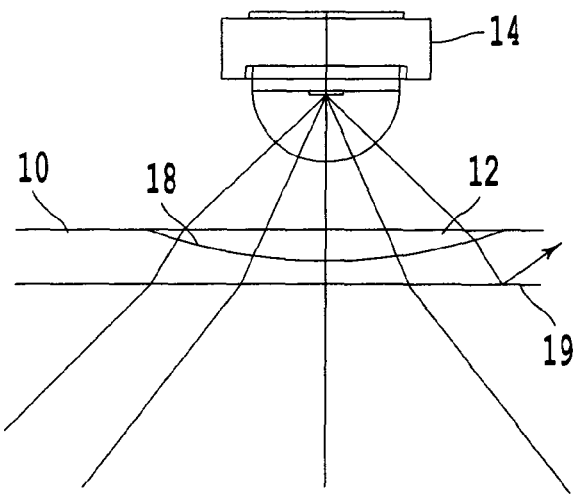

In this application the negative lenses 12 should not be so wide that they redirect the LED light between (1) $\Phi$ of 58° and 90° and (2) $\Phi$ of −58° and −90° for two reasons. Firstly, the light beyond these angles will contribute effectively to the illuminance needed to light the target edges 46. Secondly, as shown in FIG. 6B, there is less bending of the light when a ray enters the negative lens 12 through the negative lens surface 18 compared to a flat surface. As a result, if a negative lens 12 is too wide, the light would reflect off of the second surface 19 of the lens cover 10 and be trapped in the negative lens 12 through TIR (Total Internal Reflection). That is, the lenses 12 should not be so wide that they intersect the high angle rays 16 from an adjacent LED 14. This is shown in FIG. 6B where the negative lens surface 18 is too wide.

Therefore angle ($\Phi$) between each LED 14 and the edge of the negative lens is preferably between 39° and 58° as well as −39° and −58°. In one embodiment the angle $\Phi$ of +/−39° has a tolerance of +/−5°. In a further embodiment the angle $\Phi$ of +/−58° has a tolerance of +/−5°.

Figure 7A:
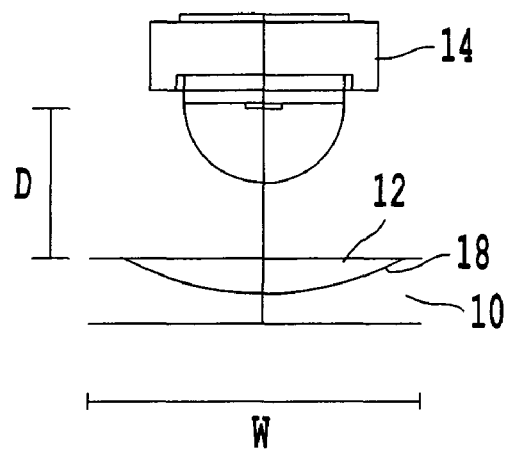
FIGS. 7A and 7B show spacings between LEDs and corresponding negative lenses according to the present invention.
Figure 7B:
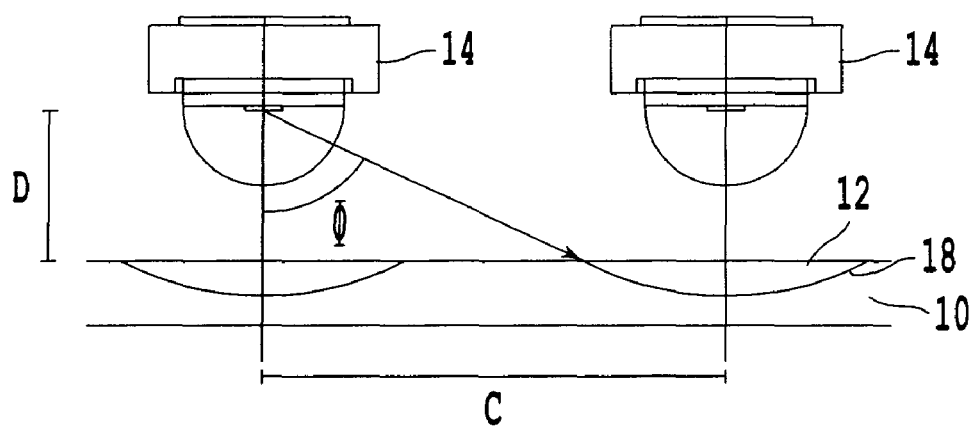

Therefore, in a preferred embodiment of the present invention, as shown in FIGS. 7A, 7B, the ratio of the negative lens 12 surface width W to the distance D between the LED 14 die and the negative lens 12 top surface is controlled. An angle $\Phi$ range of 39° to 58° in FIG. 6A corresponds to a ratio W/D (as shown in FIG. 7A) between 1.6 and 3.2. In the example in the embodiment of the present invention of FIG. 1, and as shown in FIGS. 7A, 7B, the negative lens 12 may have a radius of 10.5 mm and the LED 14 die can be positioned 5.4 mm from the top surface of the lens cover 10.

By keeping the second surface 19 of each negative lens 12 flat or substantially flat, the array of negative lens 12 surfaces can be integrated into the light cover 10. Thus, the surface of the cover lens that faces the outside world is the second lens surface. A typical light cover 10 would reduce the light output by more than 10% due primarily to Fresnel losses. Therefore, there is about a 10% light output gain by integrating the negative lenses 12 into the light cover 10. This integrated lens array light cover 10 can be made of plastic or glass.

The average distance C (see FIG. 7B) between LED 14 centers is also preferably controlled. If the LEDs 14 are packed too close together then the light that would escape unmodified would now interfere with the negative lens of an adjacent one of the other LEDs 14. If the LEDs 14 are spaced too far apart then the light fixture would become excessively large. For the general illumination applications discussed here light is not needed beyond an RDMH of 3. This corresponds to an angle ($\Phi$) of 72° or a ratio (C−W/2)/D of 3 as shown in FIG. 7A and FIG. 7B. In one embodiment the average ratio (C−W/2)/D is between 2.8 and 3.8.

Figure 8:
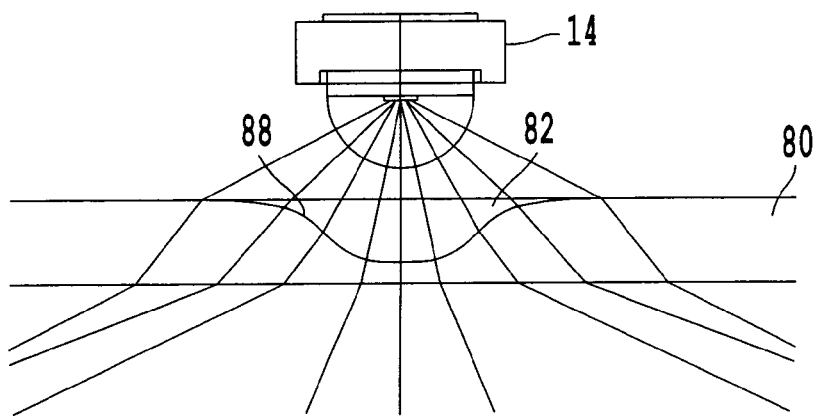
FIG. 8 shows a modification of a lens structure in a light source according to the present invention.

FIG. 8 shows a further embodiment of the present invention, which is similar to the embodiment of FIG. 1. The embodiment of FIG. 8 includes an LED 14 spaced from a lens cover 80 including a negative lens 82 with a lens surface 88. In this modified embodiment of FIG. 8 the shape of the lens surface 88 differs from the lens surface 18 in the embodiment of FIG. 1. FIG. 8 is a negative lens formed using a modified conic that was reproduced using spline points.

Figure 9A:
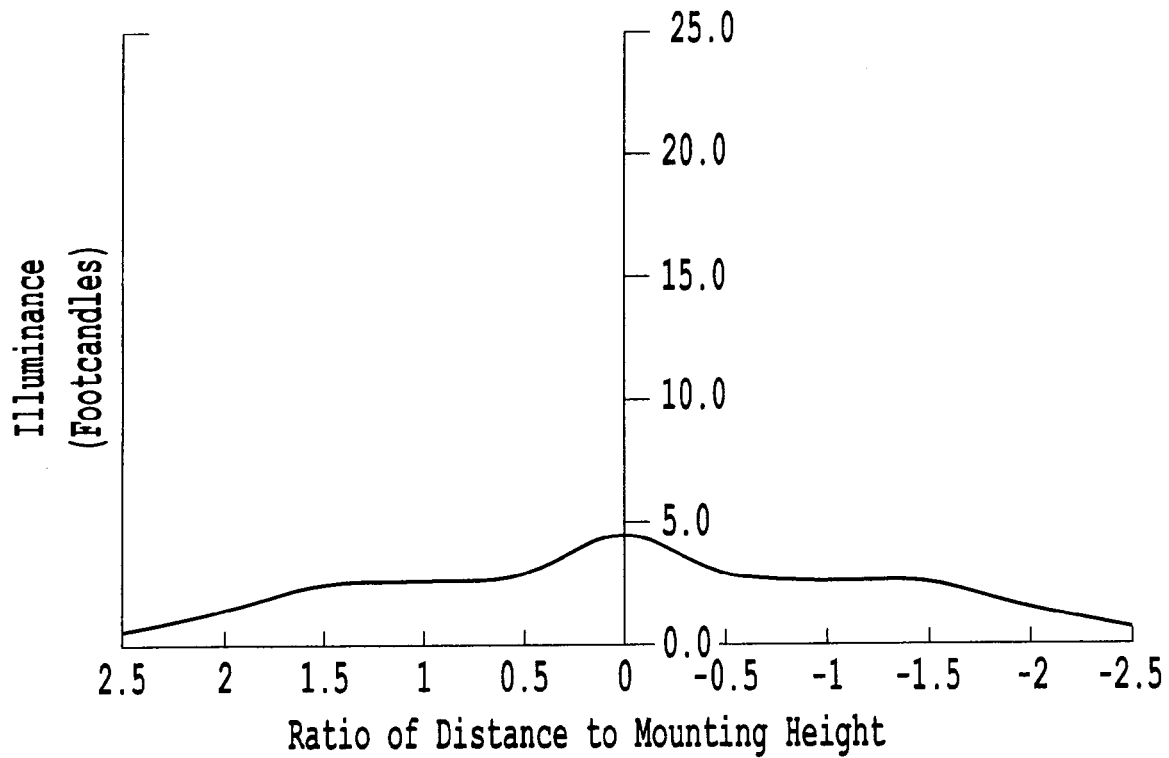
FIGS. 9A and 9B show illumination profiles of output light according to the present invention.
Figure 9B:
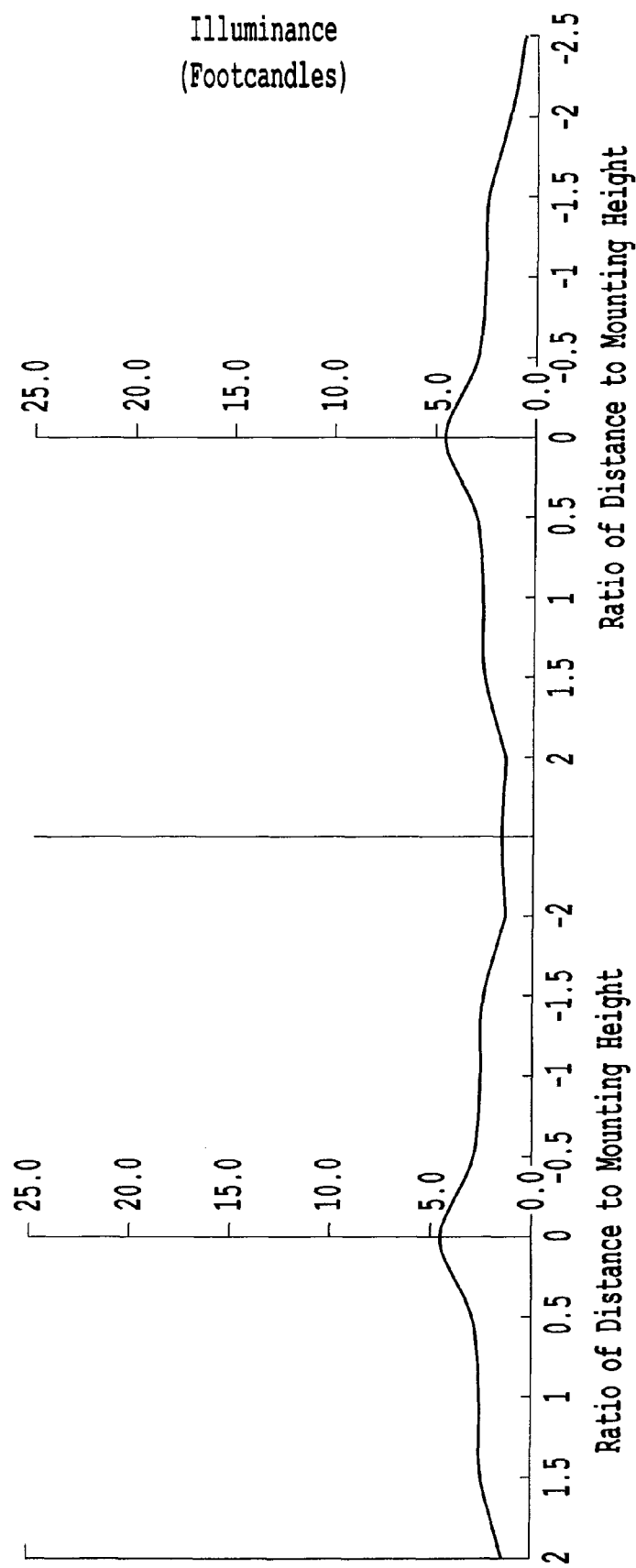
Figure 10:
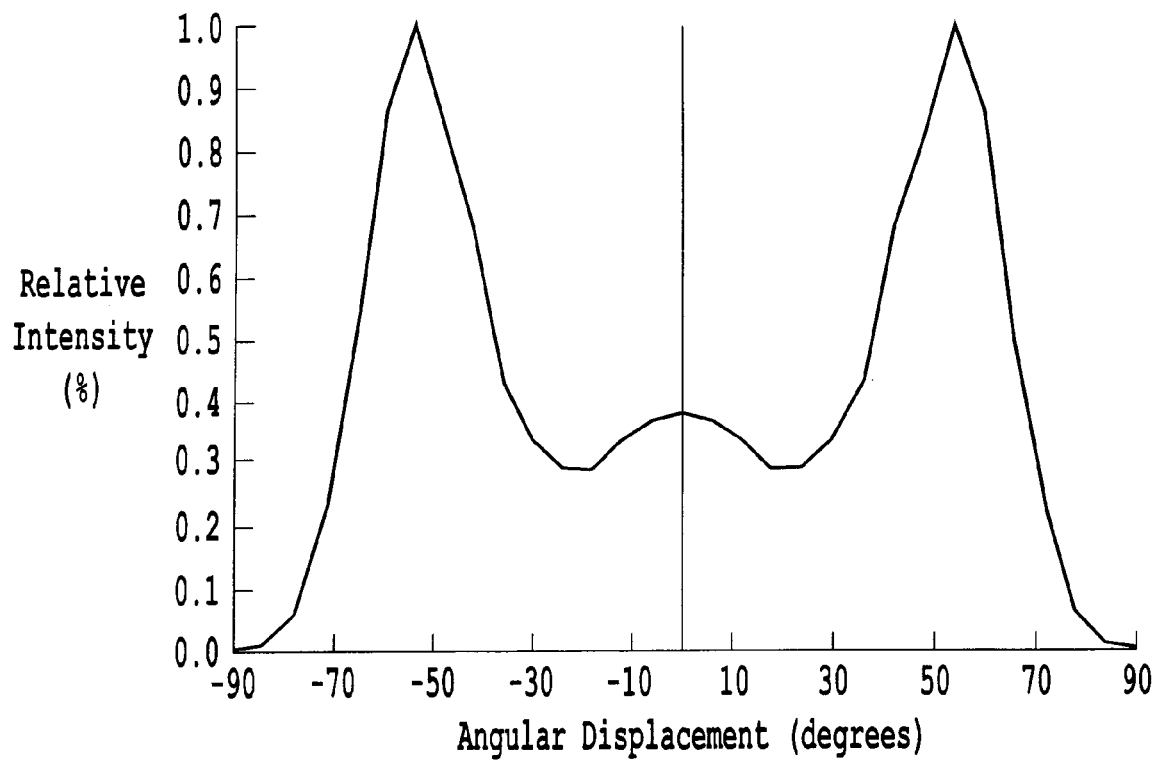
FIG. 10 shows an example intensity pattern of light output by an embodiment of the present invention.

As noted above, FIG. 5 shows the illuminance profile of an LED without a secondary optic, which results in a hot spot and the profile not being uniform. The lens surface 88 shown in FIGS. 9A, 9B show the illuminance profile of an LED with the secondary negative optic of the embodiment of the present invention shown in FIG. 8. FIG. 10 shows an example intensity profile of the present invention produced from the optic shown in FIG. 8. The intensity is low near 0 degrees and increases sharply out to about 55 degrees. This sharp increase is necessary to counter the $Cos^3 \theta$ effect. The hot spot has been significantly reduced and the uniformity improved. The maximum and minimum illuminance are 4.5 and 0.6 respectively. The resulting uniformity is 7.5 to 1 and is therefore well within the 10 to 1 requirement. In the general illumination industry a light fixture spacing corresponding to a RDMH value of 4 is considered very good. FIG. 9B shows the illuminance pattern when light fixtures are placed side-by-side at a light fixture spacing corresponding to a RDMH value of 5. The results shown in FIG. 9B demonstrate that a light fixture spacing corresponding a RDMH of 5 can be achieved with the invention herein. The maximum and minimum illuminance are 4.5 and 1.2 resulting in an excellent uniformity ratio of 3.75 to 1.

Figure 12:
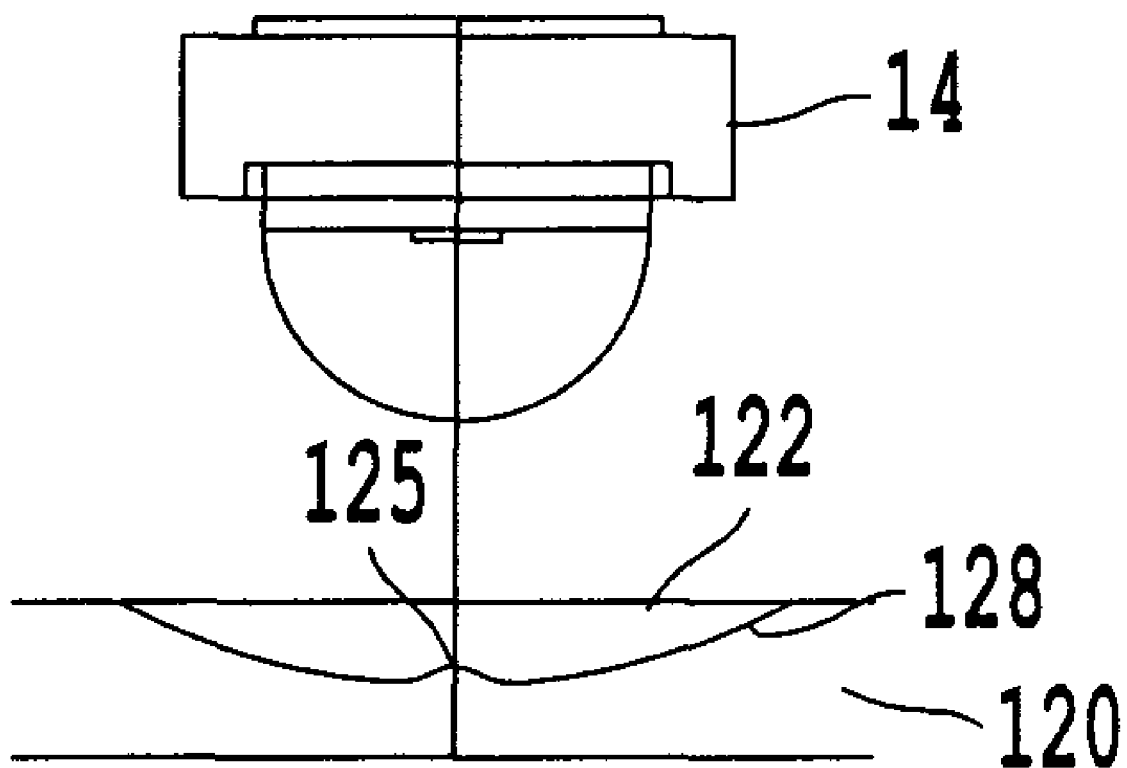
FIG. 12 shows a further modification and further embodiment of an LED light source of the present invention.

A further embodiment of the present invention as shown in FIG. 12 provides a method for significantly lowering the illuminance directly forward of the LED 14. In the embodiment of FIG. 12 a small bulge 125 is created in the center of the lens surface 128 of the negative lens 122 formed in the lens cover 120. This bulge 125 can be considered a very small positive lens portion, which should only redirect the very high intensity light forward of the LED 14. If the bulge 125 were too wide it would create a dark spot in the center target area 44 (of FIG. 4). The bulge 125 should be contained to an angle ($\Phi$) of between about 0° and 10° as well as 0° and −10°.

With the embodiment of FIG. 1 of the present invention it would not be difficult to maintain an almost constant illumination out to the edges 46 of the target area 42 of FIG. 4. However, the intensity at high angles would have to be very high due to the $Cos^3 \theta$ effect. This high intensity light would be directly viewable to a person standing nearby and may cause objectionable eye glare.

Figure 11:
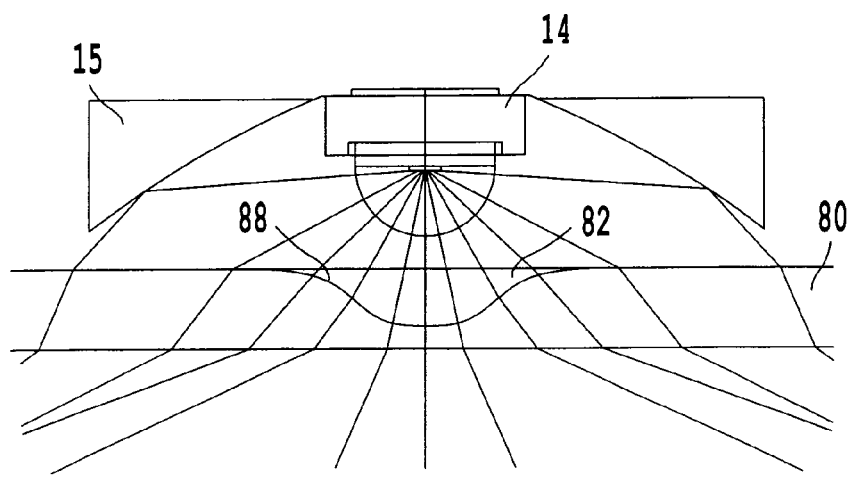
FIG. 11 shows a further modification and further embodiment of an LED light source of the present invention.

A further embodiment of the present invention as shown in FIG. 11 provides an additional structure that can increase the efficiency of the light fixture. In the embodiment of FIG. 11 a reflector 15 is added adjacent to the LED 14. That is, to further increase the illumination the reflector 15 can be added to capture the light near 90° and near −°90 as shown in FIG. 11. The reflector 15 can be made of metal or can be made of plastic and then metalized. The embodiment in FIG. 11 shows utilizing the lens cover 80 with the negative lens 82 with the lens surface 88 of FIG. 8, but the embodiment of FIG. 11 could also clearly be applied to the embodiment of FIG. 1 including the lens cover 10 and negative lens 12 with lens surface 18.

To create the desired light output intensity pattern, the negative lenses 12 in the embodiment of FIG. 1 can have a conic or conic-like shape. The negative lenses 12 can take the shape of any conic including a hyperbole, a parabola, an ellipse, a sphere, or a modified conic.

As a modification of the embodiment of FIG. 1, the negative lenses 12 can have different curvatures in the X and Y directions. For example a negative lens 12 may have the curvature shown in FIG. 7A in one axis, but in another axis the lens may have the curvature shown in FIG. 8. This will result in a non-symmetric pattern. The negative lenses 12 can have more than just two curvatures blended together. In a modification of the above embodiments each of these curves can be formed from a conic or conic like shape. In a further embodiment the curves are made from a set of spline points.

In a further modification of the above embodiments of the present invention the illumination device can include a lens with a surface having segmented or faceted conic-lens surfaces as shown for example in co-pending applications U.S. Ser. No. 11/069,989 filed Mar. 3, 2005, U.S. Ser. No. 11/620,968 filed Jan. 8, 2007, and U.S. Ser. No. 11/745,836 filed May 8, 2007, the entire contents of each of which are incorporated herein by reference. That illumination device still includes an LED and a lens.

Choosing the specific shape of any of the negative lens 12 curvatures can change the illumination/intensity pattern generated by the LED illumination device. As noted above, the lenses each have a conic or conic-like shape to realize the desired illumination pattern.

Conic shapes are used commonly in lenses and are defined by the function:

$$z = \frac{cr^2}{1 + \sqrt{1 - (1+k)c^2 r^2}} \quad (1)$$

$$r^2 = x^2 + y^2$$

where x, y, and z are positions on a typical 3-axis system, k is the conic constant, and c is the curvature. Hyperbolas (k<−1), parabolas (k=−1), ellipses (−1<k<0), spheres (k=0), and oblate spheres (k>0) are all forms of conics. In the example in the embodiment of the present invention of FIG. 1, and as shown in FIGS. 7A, 7B, the negative lens 12 may have a radius of 10.5 mm. Changing k and c will change the shape of the illumination/intensity pattern.

One can also modify the basic conic shape by using additional mathematical terms. An example is the following polynomial:

$$z = \frac{cr^2}{1 + \sqrt{1 - (1+k)c^2 r^2}} + F \quad (2)$$

where F is an arbitrary function, and in the case of an asphere $$F \text{ can equal } \sum_{n=2}^{10} C_{2n} r^{2n},$$

in which C is a constant.

Conic shapes can also be reproduced/modified using a set of points and a basic curve such as spline fit, which results in a conic-like shape for lens.

Thereby, one of ordinary skill in the art will recognize that the desired illumination/intensity pattern output by the illumination devices can be realized by modifications to the shape of negative lenses 12 by modifying the above-noted parameters such as in equations (1), (2).

Also similar to the embodiment, each different curvature portion of the negative lenses 12 can be reproduced/modified using a set of points and a basic curve such as a spline fit, which results in a conic-like shape for the negative lenses 12. Again, each curvature portion may satisfy equations (1) or (2) noted above, and in that case the conic constant k, curvature c, or arbitrary function F would be changed for each lens portion.

As further ways that the above-discussed embodiments of the present invention could be modified, each of the negative lenses 12, 82 in the lens covers 10, 80 need not be identical. That is, different negative lenses opposite different LEDs could have different shapes to provide a specific type of desired illumination/intensity pattern.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An illumination source comprising:
   (a) an array of light emitting diodes (LEDs);
   (b) an array of individual lens surfaces integrated together and positioned forward of the array of LEDs by a distance D, wherein D is the distance from the array of LEDs to a closest surface of the array of individual lens surfaces, the individual lens surfaces having a width W;
   (c) wherein the individual lens surfaces are substantially negatively powered; and
   (d) wherein the lens surfaces and array of LEDs satisfy W/D between 1.6 and 3.2,
   wherein the individual lens surfaces include at least one surface curvature incorporating a positive lens portion contained to an angle of between about 0° and 10° as well as 0° and −10° with respect to optical axes of the LEDs.

2. An illumination source according to claim 1, wherein optical axes of the LEDs are separated by a distance C, and the LEDs are positioned so that an average ratio (C−W/2)/D is between 2.8 and 3.8.

3. An illumination source according to claim 1, wherein the individual substantially negative lens surfaces are non-symmetric and have two or more surface curvatures.

4. An illumination source according to claim 3, wherein at least one surface curvature of the individual lens surfaces is a conic or conic-like shape.

5. An illumination source according to claim 1, wherein the conic or conic-like shape of the lens surfaces has a shape selected from the group consisting of: a hyperbola; a parabola; an ellipse; a sphere; or a modified conic.

6. An illumination source according to claim 1, wherein the array of individual lens surfaces are integrated into a first surface of a cover formed of plastic, wherein a second surface of the cover faces externally.

7. An illumination source according to claim 6, wherein the plastic is polycarbonate, acrylic, or silicone.

8. An illumination source according to claim 1, wherein the substantially negative powered individual lens surfaces form a conic or conic-like curve.

9. An illumination source according to claim 8, wherein the conic or conic like curve satisfies the equation:

$$z = \frac{cr^2}{1 + \sqrt{1 - (1+k)c^2 r^2}}$$
$$r^2 = x^2 + y^2,$$

in which x, y, and z are positions on a 3-axis system, k is conic constant, and c is curvature.

10. An illumination source according to claim 8, wherein the conic or conic-like curve satisfies the equation:

$$z = \frac{cr^2}{1 + \sqrt{1 - (1+k)c^2 r^2}} + F$$
$$r^2 = x^2 + y^2,$$

in which x, y, and z are positions on a 3-axis system, k is conic constant, c is curvature, and F is an arbitrary function.

11. An illumination source according to claim 8, wherein said conic or conic-like curve is represented by a set of points and a basic curve or a spline fit, resulting in a conic-like shape.

12. An illumination source according to claim 1, wherein the width W of the negative lenses is limited and does not redirect the LED light between 58 degrees and 90 degrees and −58 degrees and −90 degrees with respect to optical axes of the LEDs.

13. An illumination source according to claim 6, wherein a reflector is positioned adjacent to the LED, wherein the reflector reflects LED light near 90 degrees and −90 degrees with respect to optical axes of the LEDs, wherein the reflected light is directed forward of the LEDs and through the cover.